United States Patent [19]
Walsh et al.

[11] 4,085,449
[45] Apr. 18, 1978

[54] DIGITAL MODEM

[75] Inventors: Dale M. Walsh, Clearwater; Karl I. Nordling, Largo, both of Fla.

[73] Assignee: Paradyne Corporation, Largo, Fla.

[21] Appl. No.: 744,994

[22] Filed: Nov. 26, 1976

[51] Int. Cl.² .......................... H04J 3/12; H04M 1/76
[52] U.S. Cl. .................................. 364/900; 364/200; 179/16 F
[58] Field of Search .............................. 364/200, 900

[56] References Cited
U.S. PATENT DOCUMENTS

| | | | |
|---|---|---|---|
| 3,676,858 | 7/1972 | Finch et al. | 340/172.5 |
| 3,714,635 | 1/1973 | Hamilton et al. | 340/172.5 |
| 3,754,217 | 8/1973 | Bell et al. | 340/172.5 |
| 3,806,658 | 4/1974 | Anderson et al. | 179/16 F |
| 3,902,165 | 8/1975 | Artom | 340/172.5 |
| 4,009,356 | 2/1977 | Borysiewicz et al. | 179/170.2 |
| 4,020,472 | 4/1977 | Bennett et al. | 340/172.5 |

*Primary Examiner*—Gareth D. Shaw
*Assistant Examiner*—C. T. Bartz
*Attorney, Agent, or Firm*—Arthur W. Fisher, III

[57] ABSTRACT

A digital modem comprising a discrete analog/digital converter and digital processor for high-speed digital data transmission by means of analog signals over analog transmission facilities. The analog/digital converter comprises a transmitter section including a digital-to-analog converter and an analog matching interface, and a receiver section including an analog matching interface and analog-to-digital converter. The digital processor comprises a signal processor set, a processor control set and a multiplier/memory set capable of digital manipulation and computation of digitized data signals to accomplish the required encoding, filtering, modulation, demodulation, equalization, decoding and control function.

9 Claims, 6 Drawing Figures

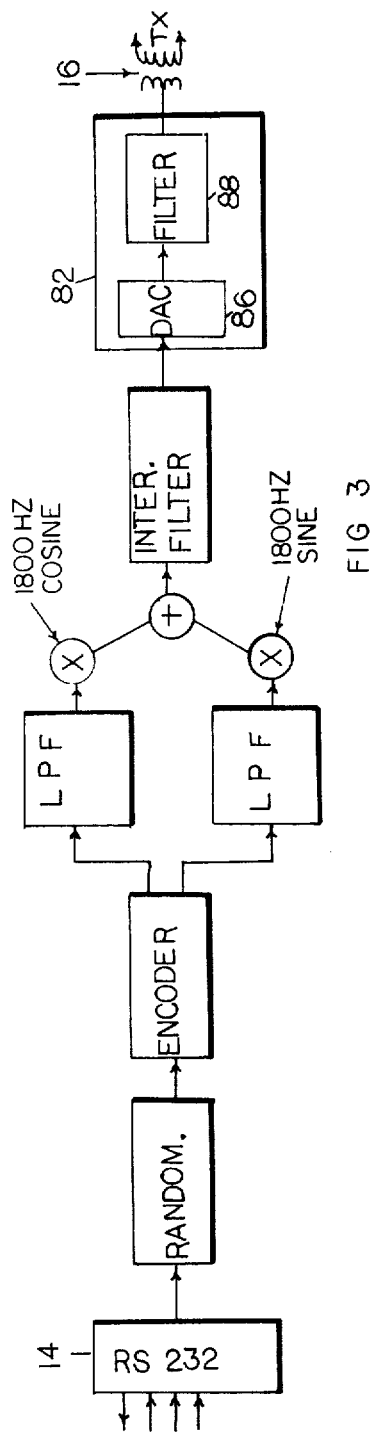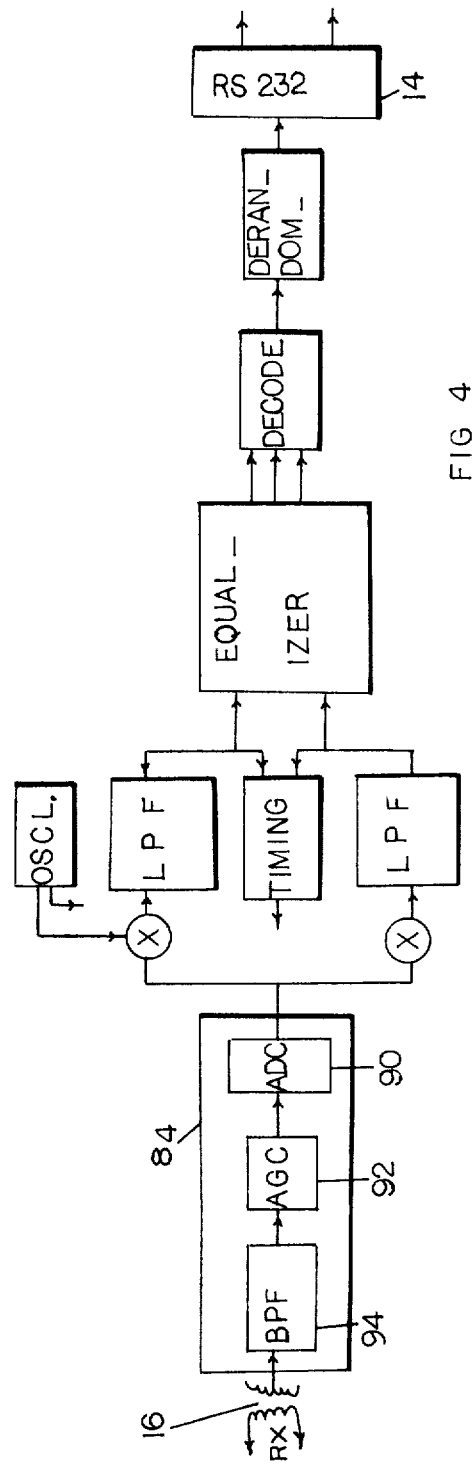

DIGITAL MODEM

BACKGROUND OF THE INVENTION

1. Field of the Invention

A digital modem including circuitry capable of digital manipulation and computation of digitized data signals to accomplish the required encoding, filtering, modulation, demodulation, equalization, decoding and control function.

2. Description of the Prior Art

Existing data communications systems which require an immediate transfer of data between a computer and another distant computer or I/O device, normally use voice-grade telephone lines as the transmission medium between two locations. Systems that have only a small number of I/O locations and a need for nearly 24 hours per day data transfer commonly employ special dedicated or private lines between locations. These lines are leased from common carriers and are often engineered to meet special data signaling requirements.

However, there is a large class of phone-line data transmission users hereafter referred to as telecommunications users which need the switching flexibility of the dial-up telephone network for telecommunications. It is these users which are especially hampered by serious imcompatibilities in existing systems, and for which the present invention provides an effective solution.

To successfully transfer data signals over the bandwidth limited phone network, special signal processing equipment or modems are required. These modems generally accept the DC pulse output from a computer or terminal equipment and convert this pulse to an audio signal suitable for transmission over voice-grade lines or similar facilities. These signals are reconverted to their original pulse state at the receiving end for use by the terminal equipment.

Characteristically these devices employ hardwired logic circuitry specifically designed for particular signals processing functions. Such hardwired circuitry inhibits the wide or general use of specific design configurations. Moreover system integration of components between locations exhibiting different hardwired specifications such as filters and equalizers complicate and compound overall system design and hardware.

Recent advances in digital circuitry provide a means of implementing a programmable digital signal processor or modem with greater flexibility and less cost than that generally associated with the more common hardwired logic block systems. Thus implementation of a programmable signal processor or modem controlled by software-like instructions which manifast characteristics generally associated with digital computers to derive or process analog signals with A/D and D/A converters is impossible with digital manipulation of the digitized signal samples. Moreover digital manipulations or computations are easily altered for system compatibility with user requirements.

SUMMARY OF THE INVENTION

The present invention relates to a digital modem. More specifically the digital modem comprises an analog/digital converter means, digital processor means, data interface means, transmission facility interface means, external control interface means and clock/timing means.

As described more fully hereinafter, the digital modem employs a combination of elements to achieve real-time signa processing functions such as modulation, demodulation, filtering and equalizing capable of use with various systems through programming. To achieve the design of this digital modem, the basic mathematical operations required in all the functional areas of the digital modem such as filters and equalizers have been reduced to one standard computational form.

The digital processor means comprises a signal processor set, processor control set and multiplier/memory set operatively coupled by a first (data in) and second (data out) bus means. The signal processor set comprises a multiple-bit bipolar microprocessor including memory, arithmetic logic unit and word register. The processor control set comprises a program address generator, read only memory and instruction register. The processor control set also includes an interrupt logic means and jump command logic means together with a first (address) and second (condition) decoders. The multiplier/memory set comprises a high speed multiplier, data memory and coefficient memory.

The analog/digital converter means comprises a transmitter and receiver analog/digital section. The transmission analog/digital section comprises a digital-to-analog converter and analog filter. The receiver analog/digital section comprises an analog-to-digital converter, automatic gain control means and analog filter. The clock/timing means comprises a transmitter clock system and receiver clock system coupled between data out bus and processor control set.

The memory or register file of the signal processor set comprises a multiple-word including two output ports through which any two registers can be read out simultaneously. The registers, read through A and B ports are specified by the A and B address supplied to the file. The B address also specifies the register which is to be written into during the instruction cycle. The processor uses a plurality of multiple instruction words. The plurality of multiple instruction words define the system logic as read, write or condition jump.

The program address generator may be implemented by a AMD 2911 microprogram sequencer. The 2911 is basically an arrangement for supplying the program address from one of four different sources. Three of these sources are address register, microprogram counter or top stack. The fourth is an external source. The different sources are selected by means of a multiplexer under control of a jump command logic means. A predetermined combination of bits is used to control the jump command. For all non-jump instructions, the jump command presented to the program address generator is the "Normal Step" command. This is gated by a first jump signal. When one of a plurality of predetermined conditions exists a second jump command is generated.

Several interrupt logic means are coupled between the clock/timing means and program address generator to selectively set the program address generator output to the corresponding address upon receipt of interrupt signals from any of these sources. The instruction at this address causes the current micro-program counter contents to be saved in the top stack and releases the program address generator output. The interrupt system is then disabled until the interrupt flag is reset.

All the multiplication operations of the high speed multiplier require the execution of two instructions. The first instruction applies data to the two multiplier inputs and the second instruction reads the result from the multiplier output into the signal processor set.

One of the operands in the multiplication always comes from the data memory. The other operand comes from coefficient memory or the data out bus. All Read DM and Read DM/CM instructions cause the data memory output to be applied to the A-input of the multiplier, whether a multiply is intended or not. The coefficient output is applied to the B-input of the multiplier on all Read CM and Read DM/CM instructions.

One important application of the addressing feature of the memories occurs in the transversal filter calculations. Here the objective is to evaluate the expression $$S(n) = \int_{i=1}^{M} S(n-1) * C(i)$$

for successive integral values of $N$. This requires the successive read out of the X's and C's and the shifting of the X's so that $X(N-i)$ is put into the former location of $X(n-i-1)$. Shifting the oldest off the end of the register is simulated by putting $X(N-M)$ nowhere. This shifting operation is accomplished in conjunction with the multiply of a pair of instructions.

The first instruction places the contents on the data out bus for writing into the current location of the data memory on the second half of the cycle. During the first half of the cycle that location is read out and ultimately placed on the data in bus for writing into the signal processor set during the second half of the cycle.

Another important application of the memories and multiplier system is the multiplication of data words stored in data memory with data from the signal processor set.

The first instruction causes the current location of data memory to be applied to one multiplier input and data output bus to be applied to the other multiplier input. The second instruction reads the result into the signal processor set and causes the selected operation to be performed on it.

The operation of the digital modem as described hereinafter provides a cost effective and flexible high speed device which through programming provides a high degree of system compatibility. A wide variety of parameter specifications can be easily accommodated in this design by modification of read only memory constants.

The basic modem is implemented in a quadrature fashion with the signal vector being generated by the summation of an in-phase and quadrature channels are separated by the demodulator and filtered separately, and then fed to a long complex transversal equalizer, and from there to a QAM decoder. The signal processing is entirely digital with the exception of the D/A converter and line filter in the transmitter and the line filter, AGC and A/C converter in the receiver.

To operate, a local and remote digital modem are linked together over appropriate transmission links through the transmission facility interface means. Initially the device enters a training cycle to establish communications links prior to data transmission as typically provided in such modem systems.

The signal processor set is a slow speed processor to perform the basic operational function in response to instruction from the processor control set which keeps an inventory of the tasks to be performed by the multiplier/memory set on different ports by continuously scanning and servicing the EIA inputs on each port. The signal processor set informs the multiplier/memory set of the tasks to be performed. Thus, the multiplier/memory set is always performing signal processing operations on each port according to information stored. If at any time the signal processor set recognizes any change in required activity at a particular port, it informs the processor control set of this change by updating the list of tasks the multiplier/memory set has to perform. The multiplier/memory set then starts executing the new task immediately.

Algorithms which emulate modulation and demodulation functions are micro-programmed and stored. The sequence of subroutines executed to perform a specific data set function is controlled by a macroprogram in the processor control set. The overall sequence in macroprogram is controlled by the signal processor set. The multiplier/memory set accepts serial binary data from the EIA ports and output analog transmission signals modulated by this data. Also, the multiplier/memory set accepts analog received signals from the telephone interface ports and output serial bitstreams demodulated from the received signals through the associated EIA interface.

The transmission serial data is mathematically scrambled, encoded, and altered/modulated through solution of the algorithms controlled by the processor control set by the operation of the signal processor set and multiplier/memory set. The signal is then converted from digital to analog and transmitted. The appropriate process is accomplished at the receiving system to recapture the digital data stream.

To provide a flexible system, the multiplier/memory set is configured to provide the programmer with a comprehensive set of rudimentary arithmetic, logical and timing operations with a minimum of constraints on how these operations may be used. As an example, the programs can construct either recursive or finite impulse response digital filters as required by his specific needs.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 3 is a functional diagram of the digital processor means in the transmitting configuration.

FIG. 4 is a functional diagram of the digital processor means in the receiving configuration.

Similar reference characters refer to similar parts throughout the several views of the drawings.

DETAILED DESCRIPTION OF THE PREFERRED EMBODIMENT

Figure 1:
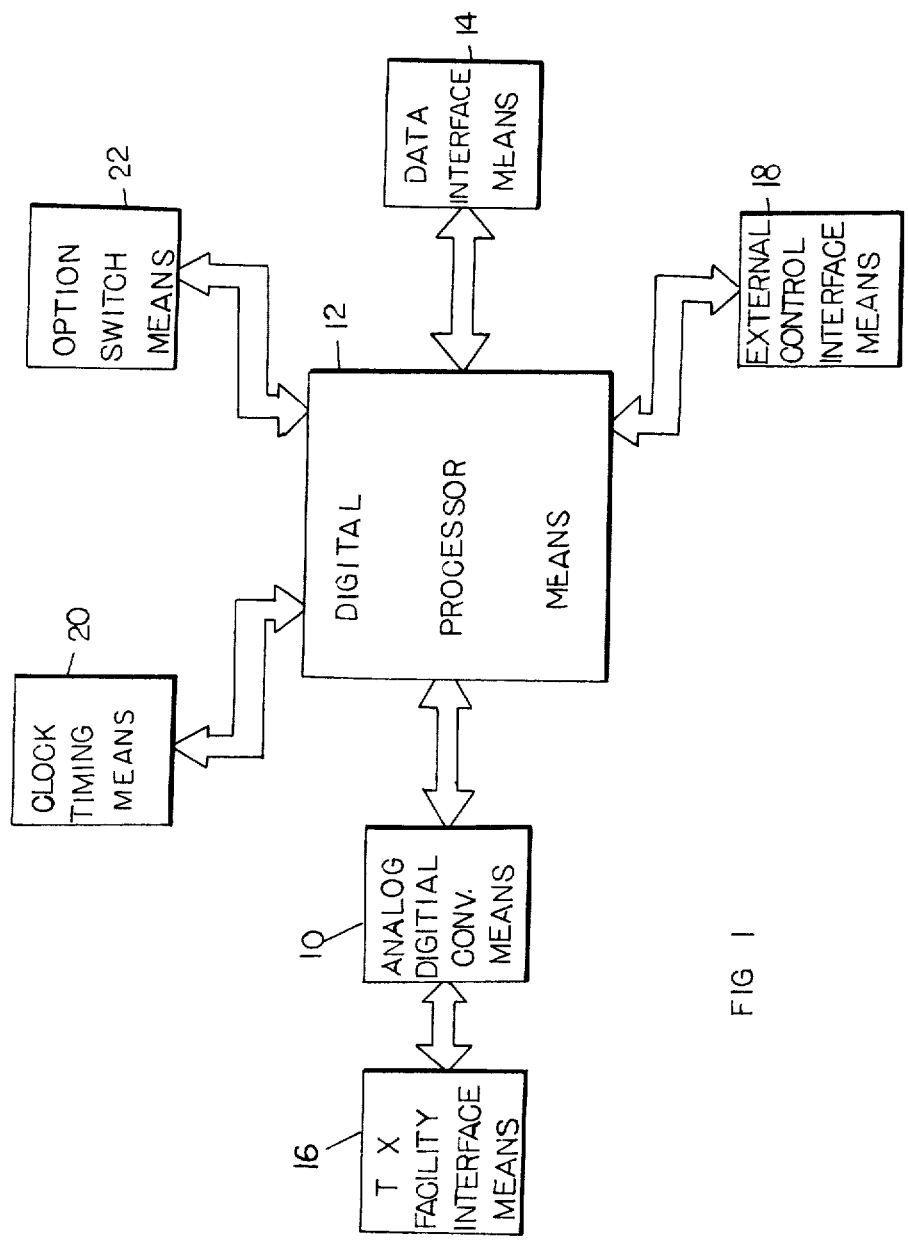
FIG. 1 is a block diagram of the digital processor means and peripheral equipment.

As shown in FIG. 1, the digital modem comprises analog/digital converter means 10, digital processor means 12, data interface means 14, transmission facility interface means 16, external control interface means 18, and clock/timing means 20. In addition, an option switch means 22 may be incorporated with the basic digital modem.

As described more fully hereinafter, the digital modem employs a combination of elements to achieve real-time signal processing functions such as modulation, demodulation, filtering and equalizing capable of use with various systems through programming. A signal processor set, processor control set and multiplier/memory set have been optimized for a special class of mathematical operations in transversal filter and adaptive equalizer calculations to transmit and receive modulated data signal. Thus a wide variety of operational parameter specifications can be easily accommodated in this design by modification of the instructions and coefficients within the modem itself.

To achieve the design of this digital modem, the basic mathematical operations required in all the functional areas of the digital modem such as filters and equalizers have been reduced to one standard computational form. The signal processor set of a standard arithmetic and logic element type such as a AMD 2901 is structured as a general purpose computer operating in a real time environment. This microprocessor employing hardwired instruction control and treating such modem functions as a clock system, A/D converters, D/A converters and EDP interface as peripherals can well provide the computational speeds required for the modem signal processing equations.

Figure 2A:
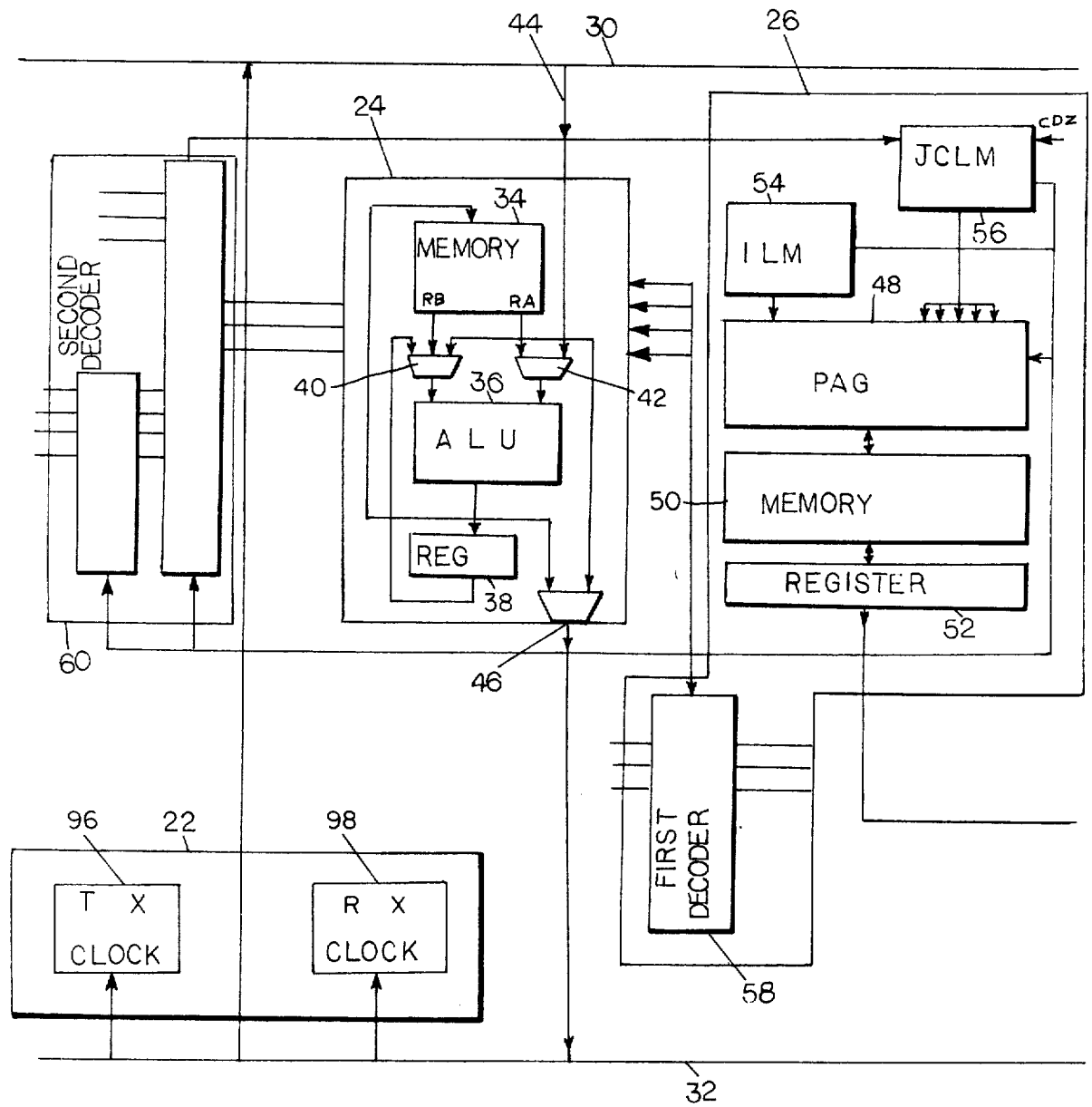
FIGS. 2A and 2B are detailed block diagram of the digital process means.
Figure 2B:
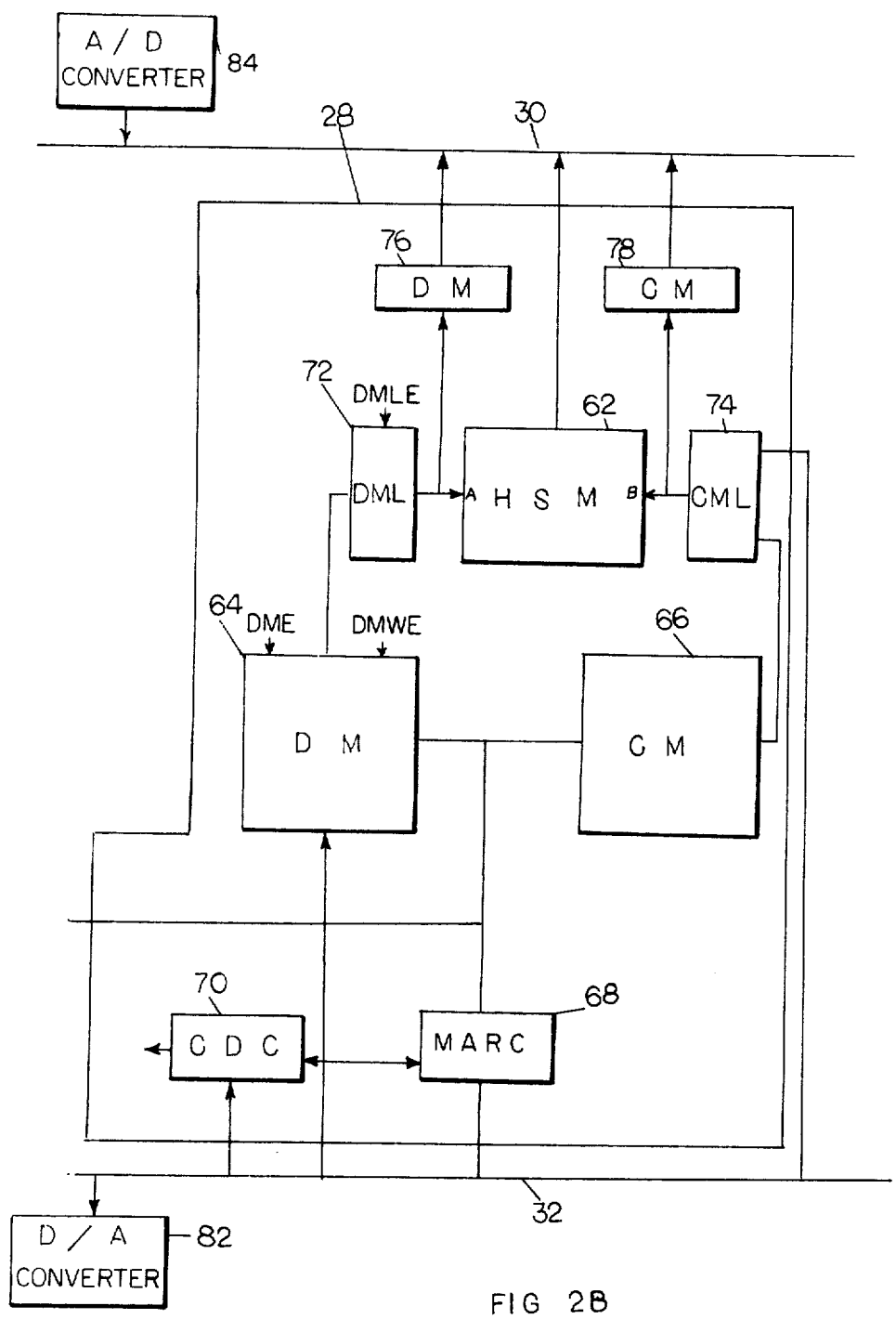

As shown in FIG. 2, the digital processor means 12 comprises signal processor set 24, processor control set 26 and multiplier/memory set 28 operatively coupled by first (data in) and second (data out) bus means 30 and 32 respectively. The signal processor set (SPS) 24 comprises a multiple-bit bipolar micorp cessor such as an AM2901 including memory 34, arithmetic logic unit 36 and word register 38. The signal processor set 24 further includes a first and second multiplexors 40 and 42 respectively together with input (D) and output (Y) ports 44 and 46 respectively.

The processor control set (PCS) 26 comprises a program address generator (PAG) 48, read only memory (ROM) 50 and instruction register (IR) 52. The PCS also includes interrupt logic means (ILM) 54 and jump command logic means (JCLM) 56 together with a first (address) and second (condition) decoders 58 and 60 respectively.

The multiplier/memory set (MMS) 28 comprises a high speed multiplier (HSM) 62, data memory (DM) 64, coefficient memory (CM) 66, memory address counter (MARC) 68 and limit counter (CDC) 70. Also included are first (DML) and second (CML) latches 72 and 74 respectively. The MMS further includes a first (DM) and second (CM) gate 76 and 78 respectively.

As shown in FIGS. 3 and 4, the analog/digital converter means 10 comprises transmitter and receiver analog/digital sections 82 and 84 respectively. The transmission analog/digital section 82 comprises a digital-to-analog converter 86 and analog filter 88. The receiver analog/digital section 84 comprises an analog-to-digital converter 90, automatic gain control means 92 and analog filter 94.

As shown in FIG. 2, the clock/timing means 22 comprises a transmitter clock system 96 and receiver clock system 98 coupled between data out bus 32 and PCS 26.

The memory or register file 34 comprises a multiple-word register including two output ports, RA and RB, through which any two registers can be read out simultaneously. The registers Ai and Bj, (not shown) read through A and B ports are specified by the A and B address supplied to the file 34. The B address also specifies the register which is to be written into during the instruction cycle. The ALU 36 includes logic means capable of performing three basic arithmetic operations and five logical operations on two operands, labeled R and S. Operand R is selected from Ai or the input port 44 and can also be specified as zero. Operand S is selected from the three sources, word or Q register 38, A$i$ or B$j$ in addition to zero. The resulting routing is selected from one of the following:

Result to Y
Result to Q & Y
Result to Bj
Result to Bj & Y

A detailed description of the ALU appears in the AMD publication, "Am 2901, AM 2900 Technical Data."

Figure 5:
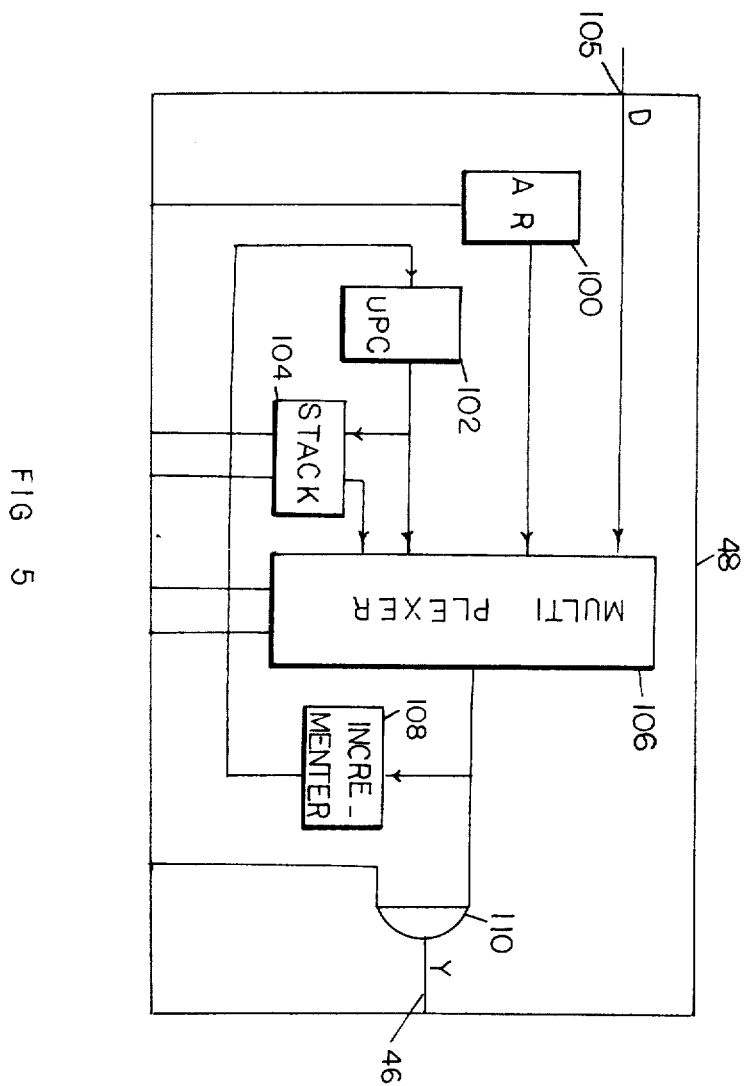
FIG. 5 is a detailed block diagram of the program address generator.

The processor instruction or control set is an extention of the basic ALU instruction set. Primarily, provisions for addressing external devices, DM, CM, DK and YK and for testing and conditional branching are incorporated. The processor uses a plurality of multiple instruction words. The plurality of multiple instruction words define the system logic as:

Write DM
Read DM & CM (Write DM)
Invalid
Read DM (Write HSM)
Condition Jump
Read CM
Write Yk
Read Dk PAG 48 may be implemented by a AMD 2911 microprogram sequencer as shown in FIG. 5. The AMD 2911 is basically an arrangement for supplying the program address Y from one of four different sources. Three of these sources are address register (AR) 100, microprogram counter (UPC) 102 or top stack (STKO) 104. The fourth source, external, comes through the D input 105. The D input 105 is also used to load AR 100 in the AMD 2911. The different sources are selected by means of the multiplexer 106 under control of the jump command logic means 56 through select lines S0 and S1. The output of the multiplexer 106, the effective address, is incremented by incrementer 108 and loaded into UPC 102 on each instruction cycle. The output is fed through OR gate 110 to Y-port 46.

As shown in FIG. 2, the jump command logic means 56 is coupled to condition decoder 60, register 52 and CDC 70. The predetermined combination of bits used to control is referred to as the jump command. The jump commands with their associated instructions and the resulting action of the PAG 48 determine what jump command is presented to the PAG 48. For all non-jump instructions, the jump command presented to the PAG 48 is a "Normal Step" command. This is gated to the PAG command bus by a first jump signal. The jump condition is decoded by the condition decoder 60. When one of a plurality of predetermined conditions exist, the condition decoder generates a second jump command causing a preselected command to be selected.

The interrupt logic means 56 as best shown in FIG. 2 is coupled to receiver sample clock 98, transmitter sample clock 96 and manual interrupt (not shown) to selectively set the PAG 48 output to zero upon receipt of an interrupt signal from any of these three sources. When the PAG output is forced to zero, the next instruction executed is the one located at "zero." This instruction (1) causes the current UPC 102 contents to be saved in STKO 104 and released the PAG output 1. The interrupt system is then disabled until the interrupt signal has been reset.

The instruction decoding takes place partly inside the 2901 CPU element and partly outside the 2901. The decoding internal to the 2901 is described in the ADM literature. The decoding external to the 2901 comprises the condition decoding and address decoding.

The condition decoding involves conditions that are only tested (e.g., by JMPO, JMPI commands); conditions that are controlled (SET or RSET), and conditions that are both tested and controlled.

Conditions that are only tested are controlled by external signals such as TRS, CD, or TXD. Conditions that are controlled only are used to provide external signals such as RXD and RXC. The conditions that are both tested and controlled are used for both external and internal signals that one part of the program controls and another part needs to test.

Address decoding determines the instruction type. Two basic addressing modes are provided: DM/CM addressing and D$k$/Y$k$ addressing. The address field is referred to as Mk in DM/CM mode and D$k$/Y$k$ in D$k$/Y$k$ mode. The former mode is used to address and control the memory and multiplier system (MMS) and the second is used to address all other external devices.

In DM/CM mode, the memory address is taken from MARC 68 when in the first state and from the instruction register 52 when in the second state. The first state also causes MARC 68 to be incremented. In D$k$/Y$k$ mode, the same address field is used addressing D$k$ and Y$k$ devices. The distinction between D$k$ (Read) and Y$k$ (Write) is made by the Write Enable Signal (WE), which is controlled by the clock 22.

All multiplication operations require the execution of two instructions. The first instruction applies data to the two multiplier inputs to the HSM 62 and the second instruction reads the result from the HSM 62 into the SPS 24.

One of the operands in the multiplication always comes from DM 64. The other operand comes from CM 74 or the Y bus 32 controlled by the MARC 68. All Read DM and Read DM/CM instructions cause the DM output to be applied to the A input of the HSM 62 whether a multiply is intended or not. The CM output is applied to the B input of the HSM 62 on all Read CM and Read DM/CM instructions. If it is desired to read the contents of DM or CM into the SPS 24, then Read DM and Read CM instructions, respectively are used. The foregoing is summarized below:

|  | Data to A-Input | Data to B-Input | Data to D-Bus |
|---|---|---|---|
| Read DM | DM out | Y-Bus | DM out |
| Read DM & CM | DM out | CM out | DM out & CM out |
| Read CM | — | CM out | CM out |

The logic to accomplish the foregoing is as follows:
The DM chip select and the DM Latch Enable (DME and DMLE) are controlled by the PCS 26 and the clock so that the DM Latch 72 tracks the output of DM during the first half of all DM or DM/CM instructions and maintains its state at all other times.

The CM Chip Select and the CM Multiplexer/Latch 74 are by CME and CMLE so that the latch tracks the output of CM during the first half-cycle of all CM and DM/CM instructions, so that WE is not active and tracks the output of SPS 24 (Y-Bus) 32 during the first half of all CM and DM/CM instructions that WE is active, and maintains its state at all other times.

Writing into DM takes place on all Write DM and Read/Write DM instructions where the A-address is even. When a Write DM or Read/Write DM instruction is executed with an odd Ai address, the Y output is directed only to HSMB.

The two memories are addressed in unison from the DM/CM address bus from the instruction word and MARC 68.

Source 1 is enabled in the random address mode and provides random access to locations 2 through 15 of the two memories. This mode is used for storage and retrieval of miscellaneous variables and constants used by various routines.

Source 2 is enabled in the sequential mode, i.e., when M$k$ = 0000 or 0001 and provides sequential access to all of DM 64 and CM 66. In the sequential mode incrementing of MARC 68 is controlled by M$k$ as follows:

M$k$ = 0000 — no increments
M$k$ = 0001 — increment

One important application of the addressing feature of the memories occurs in the transversal filter calculations. Here the objective is to evaluate the expression $$S(n) = \int_{i=1}^{M} S(n-1) * C(i)$$

for successive integral values of N. This requires the successive read out of the X's and C's and the shifting of the X's so that X(N−i) is put into the former location of X(n−i−1). Shifting the oldest off the end of the register is simulated by putting X(N−M) nowhere. This shifting operation is accomplished in conjunction with the multiply of a pair of instructions.

The first instruction places the contents on the Y-Bus 32 for writing into the current location of memory on the second half of the cycle. During the first half of the cycle that location is read out and placed in the DM latch 72, and from there to the D-Bus 30 for writing into As during the second half of the cycle. The DM01 code causes MARC 68 to be incremented at the end of the cycle. The effect of this sequence is to shift the data in DM 64 as shown.

The ability to control the length of such sequences is provided by the CDC 70 tcounter which is incremented in unison with MARC 68 and which generates the signal CDC when it overflows. This signal is used by the PAG 48 to execute a restart jump as long as CDC remains off and not otherwise. Thus the sequence is exited when CDC 70 overflows.

Another important application of the memories and multiplier system is the multiplication of data words stored in DM 64 with data from the SPS 24.

The first instruction causes the current location of DM 64 to be applied to HSMA and the Y-bus 32 to be applied to HSMB. The second instruction reads the result into the SPS 24 and causes the selected operation to be performed on it.

The operation of the digital modem as described hereinafter provides a cost effective and flexible high speed device which through programming provides a high degree of system compatibility. A wide variety of parameter specifications can be easily accommodated in this design by modification of ROM constants.

The basic modem is implemented in a quadrature fashion with the signal vector being generated by the summation of an in-phase and quadrature channels are separated by the demodulator and filtered separately, and then fed to a long complex transversal equalizer, and from there to a QAM decoder. The signal processing is entirely digital with the exception of the D/A converter and line filter in the transmitter and the line filter, AGC and A/C converter in the receiver.

Operation of the digital modem 10 can best be understood with reference to the functional diagrams of FIGS. 3 and 4. To operate, a local and remote digital modem are linked together over appropriate transmission links through the transmission facility interface means 16.

Initially the device 10 enters a training cycle to establish the communications links prior to data transmission as typically provided in such modem systems.

The signal processor set 24 is a slow speed processor to perform the basic operational function in response to instruction from the processor control set 26 which keeps an inventory of the tasks to be performed by the multiplier/memory set 28 on different ports by continuously scanning and servicing the EIA inputs on each port. The SPS 24 informs the MMS 28 of the tasks to be performed. Thus, the MMS 28 is always performing signal processing operations on each port according to information stored. If at any time the SPS 24 recognizes any change in required activity at a particular port, it informs the PCS 26 of this change by updating the list of tasks the MMS 28 has to perform. The MMS 28 then starts executing the new task immediately.

Algorithms which emulate modulation and demodulation functions are microprogrammed and stored. The sequence of subroutines executed to perform a specific data set function is controlled by a macroprogram in the PCS 26. The overall sequence in a macroprogram is controlled by the SPS 24. The MMS 28 accepts serial binary data from the EIA ports and output analog transmission signals modulated by this data. Also, the MMS accepts analog received signals from the telephone interface ports and output serial bitstreams demodulated from the received signals through the associated EIA interface.

The transmission serial data is mathematically scrambled, encoded, filtered X, filtered Y, modulated, and interpolated through solution of the algorithms controlled by the PCS 26 by the operation of the SPS 24 and MMS 28. The signal is then converted from digital to analog and transmitted. The appropriate process is accomplished at the receiving system to recapture the digital data system.

To provide a flexible system, the MMS 28 is configured to provide the programmer with a comprehensive set of rudimentary arithmetic, logical and timing operations with a minimum of constraints on how these poperations may be used. As an example, the program can construct either recursive or finite impulse response digital filters as required by his specific needs.

It will thus be seen that the objects set forth above among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A digital modem for high-speed data transmission between data terminals communicating through amplitude limited signals over analog transmission facilities capable of digitally synthesizing modem function in real time; said digital modem comprising a processor control set, a memory/multiplier set, a signal processor set, and an interface means, said processor control set including a program address generator including circuitry to sequentially generate a predetermined plurality of program addresses, a program memory coupled to said program address generator including circuitry to receive said program addresses and generate a program instruction in response thereto and an instruction register coupled to said program memory including circuitry to receive said program instruction and generate an instruction signal in response thereto; said signal processor set comprising an arithmetic log unit coupled to said instruction register to receive said instruction signal, said signal processor set including circuitry to selectively respond to said instruction signals to perform one or a plurality of predetermined arithmetic operations and generate a processor set signal in response thereto, said memory/multiplier set comprising a high speed multiplier and a memory means including a data memory and coefficient memory being coupled between said processor control set and said high speed multiplier to receive said instruction signal, said data memory further coupled to said signal processor set to receive said processor set signals therefrom, said data memory and said coefficient memory each including circuitry to selectively generate data output signals and coefficient output signals in response to said instruction signal from said processor control set, said high speed multiplier including circuitry to receive said data output signals and said coefficient output signals and generate a product signal in response thereto, said interface means being coupled between the analog transmission facilities and said signal processor set and between said signal processor set and data terminal, said interface means including circuitry to receive analog input signals from a remote digital modem over analog transmission facilities and to convert said analog input signals to digital input signals fed to said signal processor set, said interface means further including circuitry to receive said processor set signal and convert said processor set signal to analog output signals for transmission over analog transmission facilities to a remote digital modem, said signal processor set further including circuitry to receive said digital input signals from said interface means and said product signal from memory/multiplier set for performing said arithmetic operations, said interface means further including circuitry to transfer information between interface input and the data terminals in said signal processor set, said signal processor set thus providing modulation, demodulation, filtering and equalization in real time.

2. The digital modem of claim 1 wherein said multiplier/memory set further includes a memory address counter coupled between said processor control set and said data memory and said coefficient memory, said memory address counter including circuitry to selectively generate a first memory address signal when in a first state and a second memory address signal when in a second state, said first memory address signal from said memory address counter and said second memory address signal from said processor control set.

3. The digital modem of claim 2 wherein said memory means further includes a data memory latch coupled between said data memory, said high speed multiplier and said processor control set to selectively feed said data signals to said high speed multiplier and a coefficient memory latch coupled between coefficient memory, said high speed multiplier and said processor control set to selectively feed said coefficient signals to said high speed multiplier.

4. The digital modem of claim 1 wherein said processor control set further includes an interrupt logic means coupled to said program address generator, said interrupt logic means including circuitry to selectively generate a reset signal feed to said program address generator in response to any of a preselected plurality of external signals.

5. The digital modem of claim 4 further including clock/timing means coupled to said interrupt logic means, said clock/timing means including circuitry to generate said preselected plurality of external signals.

6. The digital modem of claim 5 wherein said processor control set further includes a jump command logic means coupled to said program address generator, said jump command logic means including circuitry to selectively generate one of a plurality of jump command signals fed to said program address generator in response to any of a preselected plurality of predetermined conditions.

7. The ditial modem of claim 6 wherein said processor control set further includes a condition decoder coupled between said instruction register, said signal processor set and said jump command logic means, said condition decoder including circuitry to selectively generate a first jump signal when in a first state and a second jump signal when one of a plurality of predetermined conditions exist, said first and second jump signals being fed to said jump command logic means.

8. The digital modem of claim 1 wherein said processor control set further includes an instruction decoder coupled to said processor control set, said instruction decoder including circuitry to selectively decode said instruction signals.

9. The digital modem of claim 1 wherein said signal processor set further comprises a memory including a first and second output port each coupled to said arithmetic logic unit and a word register coupled to said arithmetic logic unit, said arithmetic logic unit being coupled to said memory/multiplier means, said arithmetic logic unit including circuitry to receive a first operand selectively from said first output port and said memory/multiplier means and a second operand selectively from said register, said first output port and said second output port to generate said processor set signal.

* * * * *